(12) United States Patent
Kutaragi et al.

(10) Patent No.: US 7,687,711 B2
(45) Date of Patent: Mar. 30, 2010

(54) ELECTRONIC DEVICE

(75) Inventors: Ken Kutaragi, Kanagawa (JP); Teiyu Goto, Saitama (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 11/631,539

(22) PCT Filed: May 12, 2006

(86) PCT No.: PCT/JP2006/030959
§ 371 (c)(1),
(2), (4) Date: May 14, 2007

(87) PCT Pub. No.: WO2006/123591
PCT Pub. Date: Nov. 23, 2006

(65) Prior Publication Data
US 2008/0310082 A1   Dec. 18, 2008

(30) Foreign Application Priority Data

May 15, 2005   (JP)   ............................. 2005-171591
May 16, 2005   (JP)   ............................. 2005-143333

(51) Int. Cl.
*H02G 3/08*   (2006.01)
*G06F 1/16*   (2006.01)

(52) U.S. Cl. ........................ 174/50; 174/520; 174/559; 361/679.01; 361/679.02; 361/752

(58) Field of Classification Search ................ 174/480, 174/481, 50, 53, 57, 58, 520, 559; 220/3.2–3.9, 220/4.02; 361/600, 601, 724, 730, 752, 796, 361/683, 684, 685, 679.01, 679.02; 379/413.01–413.04
See application file for complete search history.

(56) References Cited

U.S. PATENT DOCUMENTS

| 5,572,402 | A | * | 11/1996 | Jeong | 361/685 |
| D394,266 | S | * | 5/1998 | Hogenbirk | D14/240 |
| 5,907,127 | A | * | 5/1999 | Daoud | 174/57 |
| D410,469 | S | * | 6/1999 | Sathikh | D14/242 |
| D432,523 | S | * | 10/2000 | Grinkus et al. | D14/496 |

(Continued)

FOREIGN PATENT DOCUMENTS

JP   63-123111   5/1988

(Continued)

OTHER PUBLICATIONS

Int'l Search Report, Aug. 8, 2006.

(Continued)

*Primary Examiner*—Angel R Estrada
(74) *Attorney, Agent, or Firm*—Matthew B. Dernier, Esq.; Gibson & Dernier LLP

(57) ABSTRACT

An entertainment device or other electronic device having an outward shape improved in functionality compared with that in the related art are provided. The electronic device includes a main housing that is formed in an approximately elliptical cylinder form, and disposed in a such a manner that a longitudinal direction is approximately horizontal to a setting surface, and has medium insertion ports for inserting a portable information storage medium such as an optical disk, and an approximately boxlike base portion attached to a lower portion of the main housing.

9 Claims, 8 Drawing Sheets

U.S. PATENT DOCUMENTS

| | | | |
|---|---|---|---|
| 6,301,103 B1 * | 10/2001 | Abboud | 361/679.6 |
| D457,153 S * | 5/2002 | Allen | D14/168 |
| 6,392,872 B1 * | 5/2002 | Doustou et al. | 174/559 |
| D464,045 S * | 10/2002 | Bohne | D14/240 |
| 6,510,226 B1 * | 1/2003 | Thomann et al. | 379/413.04 |
| 6,594,727 B1 | 7/2003 | Tanaka | |
| 6,631,276 B1 | 10/2003 | Yamaguchi et al. | |
| D500,299 S * | 12/2004 | Obata | D14/500 |
| D532,784 S * | 11/2006 | Kutaragi et al. | D14/356 |
| D534,166 S * | 12/2006 | Kutaragi et al. | D14/356 |
| 7,304,852 B2 * | 12/2007 | Hernandez et al. | 174/50 |
| 7,329,152 B2 * | 2/2008 | Mori et al. | 439/638 |
| D568,311 S * | 5/2008 | Kutaragi et al. | D14/356 |
| 7,388,758 B2 * | 6/2008 | Chen et al. | 174/50 |
| 7,443,691 B1 * | 10/2008 | Davis | 361/752 |
| D595,735 S * | 7/2009 | Green | D14/496 |

FOREIGN PATENT DOCUMENTS

| | | |
|---|---|---|
| JP | 5-38960 | 5/1993 |
| JP | 08-069686 | 12/1996 |
| JP | 08-339673 | 12/1996 |
| JP | 2001-77568 | 3/2001 |
| JP | 2002-043960 | 2/2002 |
| JP | 2002-092559 | 3/2002 |
| JP | 2003-295971 | 10/2003 |
| JP | 2003-347761 | 12/2003 |
| KR | 200229125 | 4/2002 |

OTHER PUBLICATIONS

International Preliminary Report on Patentability for corresponding application PCT/JP2006/309597 dated Sep. 25, 2008.

Office Action for corresponding Chinese Patent Application No. 2006800008454, May 5, 2008.

Office Action for corresponding Korean Patent Application No. 10-2007-7006427, Oct. 30, 2008.

Korean Office Action for corresponding application 10-2008-7031989, dated Jan. 5, 2010.

* cited by examiner

ELECTRONIC DEVICE

TECHNICAL FIELD

The present invention relates to an electronic device or other devices, and particularly relates to an improvement in functionality of an outward shape of a household entertainment device or other electronic devices.

BACKGROUND ART

In most electronic devices, such as an entertainment device in the related art, for example as disclosed in JP-A-2001-77568, an operational panel is disposed on the front of the instrument, and an operational button, a terminal for connecting a peripheral instrument, and the like are provided on the operational panel. According to such an outward shape, a user can easily recognize a position of the operational button or the connection terminal, and easily use the button or terminal, and consequently improve operability of a device.

SUMMARY OF THE INVENTION

An object of the invention is to provide an entertainment device or other electronic device having an outward shape improved in functionality compared with that in the related art.

An electronic device according to the invention is characterized by having a main housing that is formed in an approximately elliptic cylinder form, and disposed in such a manner that a longitudinal direction is approximately horizontal to a setting surface, and has a medium insertion port for inserting a portable information storage medium, and an approximately boxlike base portion attached to a lower portion of the main housing.

According to the electronic device of one or more embodiments of the invention, the main housing is formed in the approximately elliptic cylinder form, and disposed in such a manner that the longitudinal direction of the housing (axial direction of the elliptic cylinder) is approximately horizontal to the setting surface. Therefore, even if it is located in an accommodation rack such as an audio board, since a space is secured in an upper portion of the main housing, cooling efficiency of the electronic device is increased. As a result, functionality of the outward shape of the entertainment device is improved.

Moreover, the base portion may be attached to the lower portion of the main housing in so as to be offset in at least one direction of the longitudinal direction and a lateral direction with respect to the main housing in a plane view. According to this aspect, a space can also be secured in the lower portion of the main housing. The space is used, for example, for cooling of the electronic device or by wiring in the electronic device.

The electronic device according to another aspect of the invention is characterized by having an insertion port formation surface portion in which a medium insertion port for inserting a portable information storage medium is formed, and a front board portion that is disposed at a place lower than the medium insertion port and spreads approximately horizontally on this side of at least the insertion port formation surface portion. The electronic device is, for example, an entertainment device such as a household game machine, and when the portable information storage medium is inserted therein, information is read out from the medium. In the invention, the front board portion is provided at a place lower than the medium insertion port for inserting the information storage medium, and the front board portion spreads on the front side (a side opposite to an insertion direction) of at least the medium insertion port. Therefore, when a user inserts the information storage medium into the medium insertion port, or removes the information storage medium from the medium insertion port, the medium is prevented from directly falling to the floor, and consequently an electronic device having an outward shape that is improved in functionality compared to that in the related art is realized.

When area of the front board portion is made larger than that of the information storage medium, falling of the information storage medium can be prevented more securely. Moreover, the information storage medium to be inserted into the medium insertion port or the information storage medium removed from the medium insertion port can be temporarily placed on the front board portion.

Moreover, the electronic device may further have a cover covering a part or more of the front board portion. According to this aspect, accumulation of dust in the front board portion can be prevented. In addition, even if the information storage medium touches the front board portion, adhesion of dust to the medium is prevented.

In this aspect, the cover may be supported in such a manner that it can move between a position of covering the part or more of the front board portion and a position of exposing the part or more of the portion.

Moreover, the cover may cover the medium insertion port in addition to the part or more of the front board portion. According to this aspect, entering of dust from the medium insertion port into the electronic device can be prevented.

Moreover, it is acceptable for the electronic device to be formed in such a manner that it can be placed both vertically and horizontally, and has a plurality of insertion port formation surface portions, the cover covers the front board portion disposed in the lower side of the medium insertion port formed in one of the plurality of insertion port formation surface portions; the plurality of insertion port formation surface portions are disposed in a manner of being arranged in a horizontal direction when the electronic device is placed horizontally, and arranged in a vertical direction when it is vertically placed; and the one of the plurality of insertion port formation surface portions is disposed to be situated at the lowest side when the electronic device is vertically placed. According to this aspect, when the electronic device is vertically placed, the front board portion being nearest to a setting surface where dust tends to fly most significantly is covered by the cover.

DESCRIPTION OF THE PREFERRED EMBODIMENT

Hereinafter, an embodiment of the invention is described in detail according to drawings.

Figure 1:
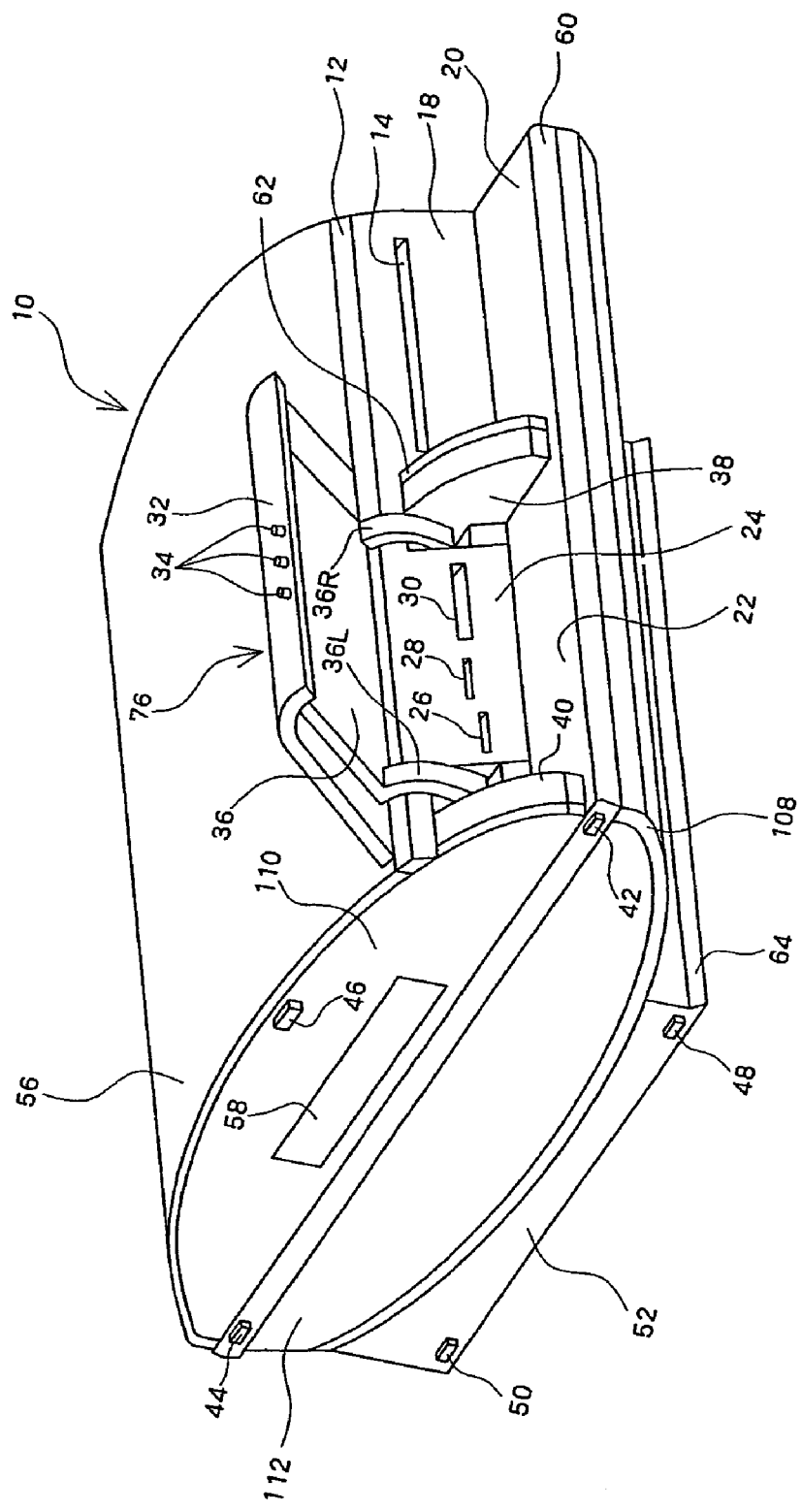
FIG. 1 is a perspective view of an electronic device according to an embodiment of the invention.
Figure 2:
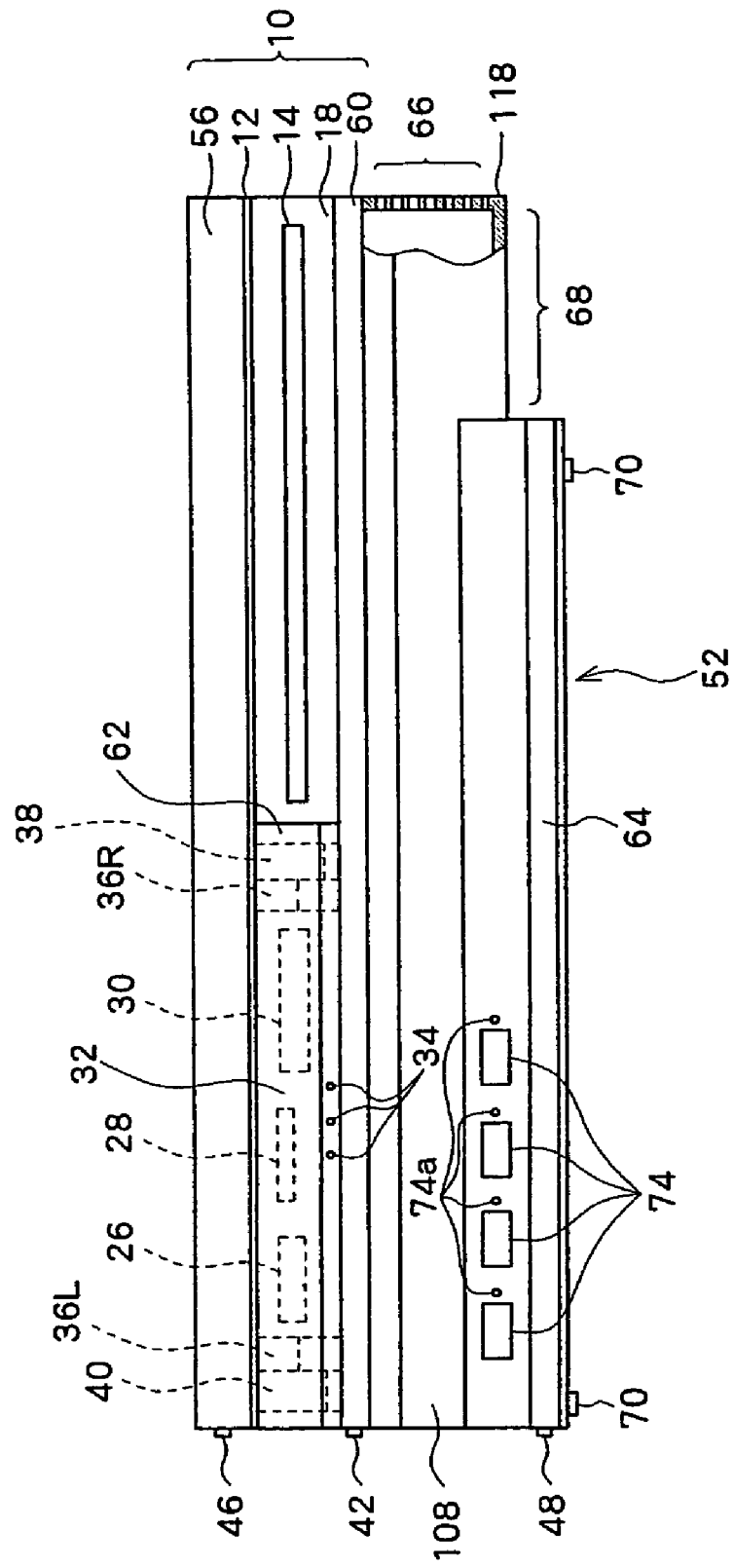
FIG. 2 is a front view of the electronic device according to the embodiment of the invention of FIG. 1.
Figure 3:
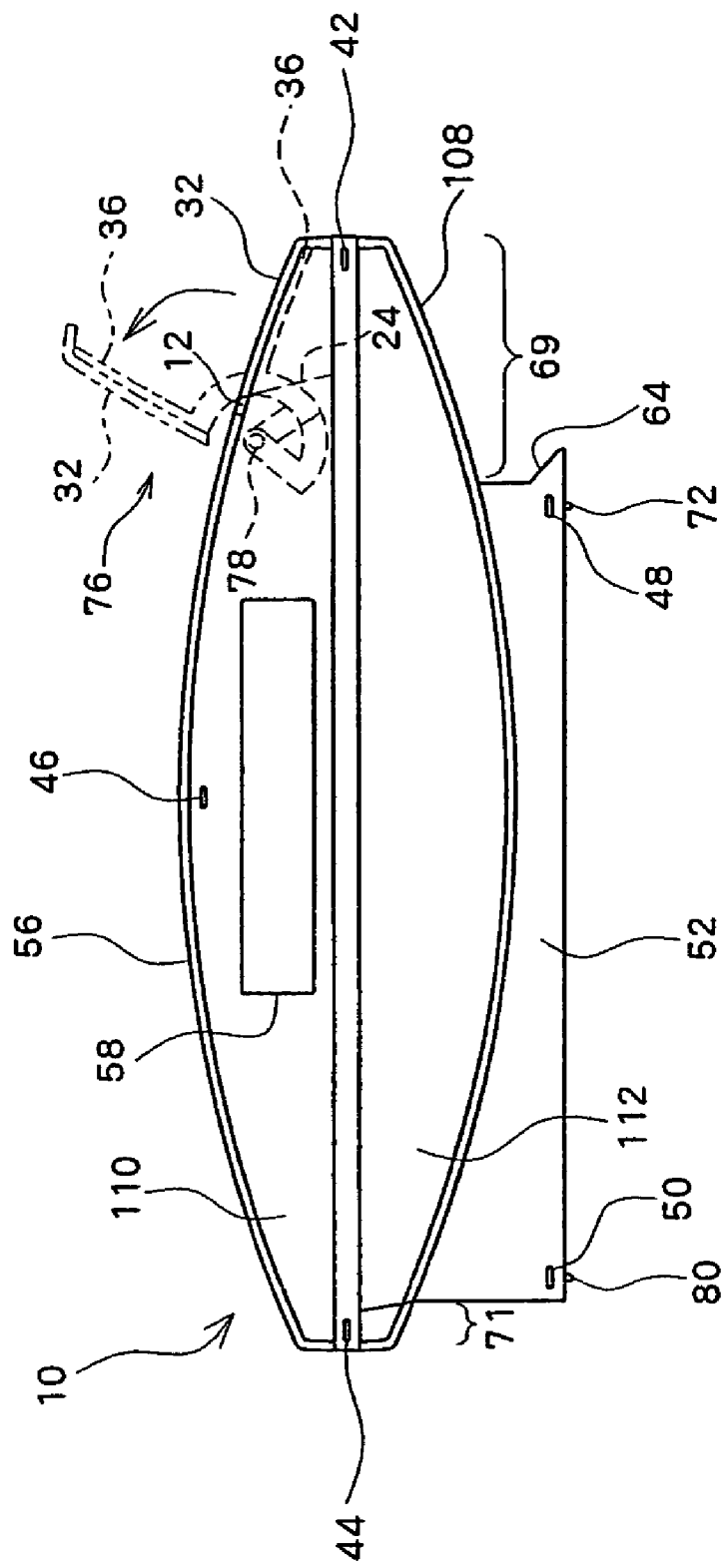
FIG. 3 is a left side view of the electronic device according to the invention of FIG. 1.
Figure 4:
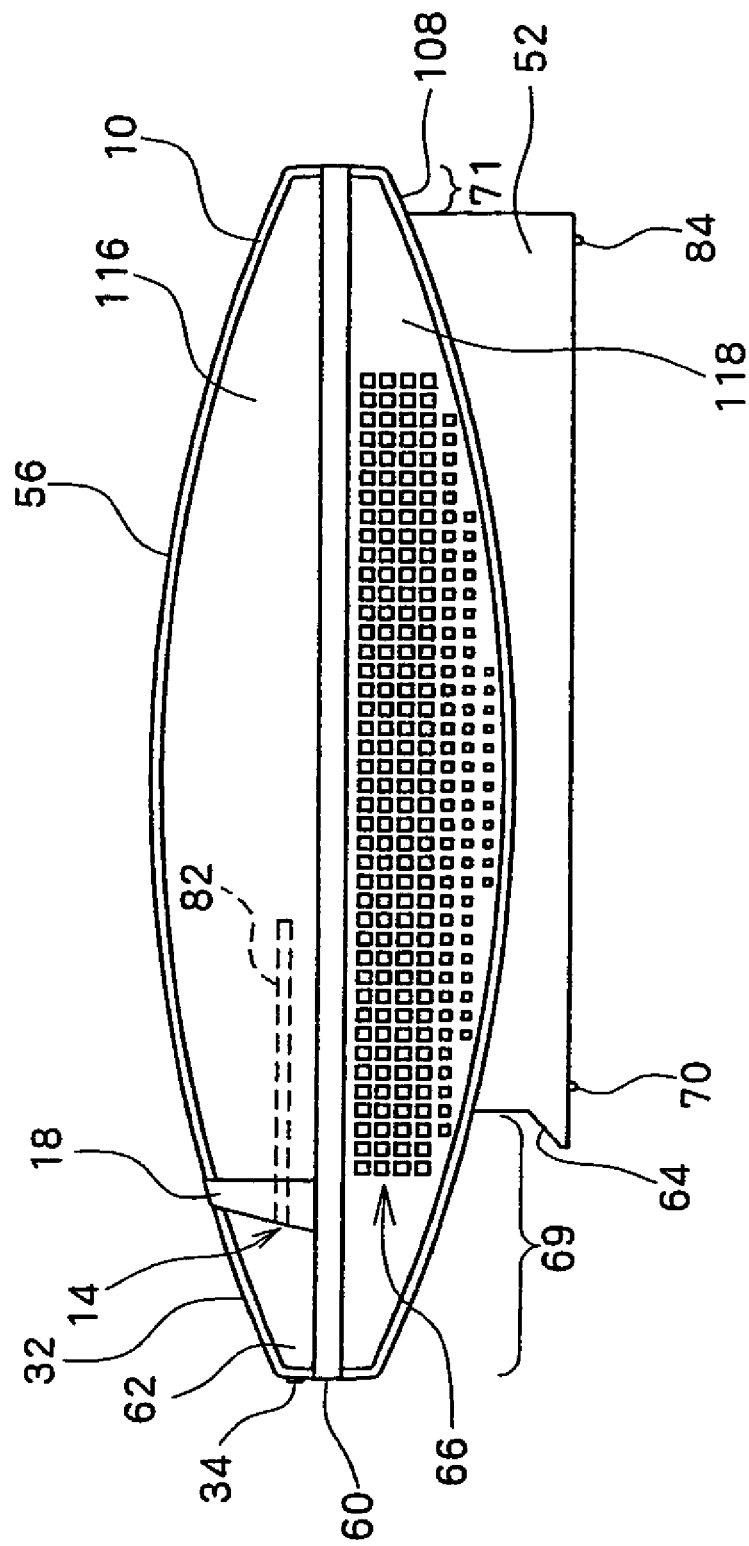
FIG. 4 is a right side view of the electronic device according to the embodiment of the invention of FIG. 1.
Figure 5:
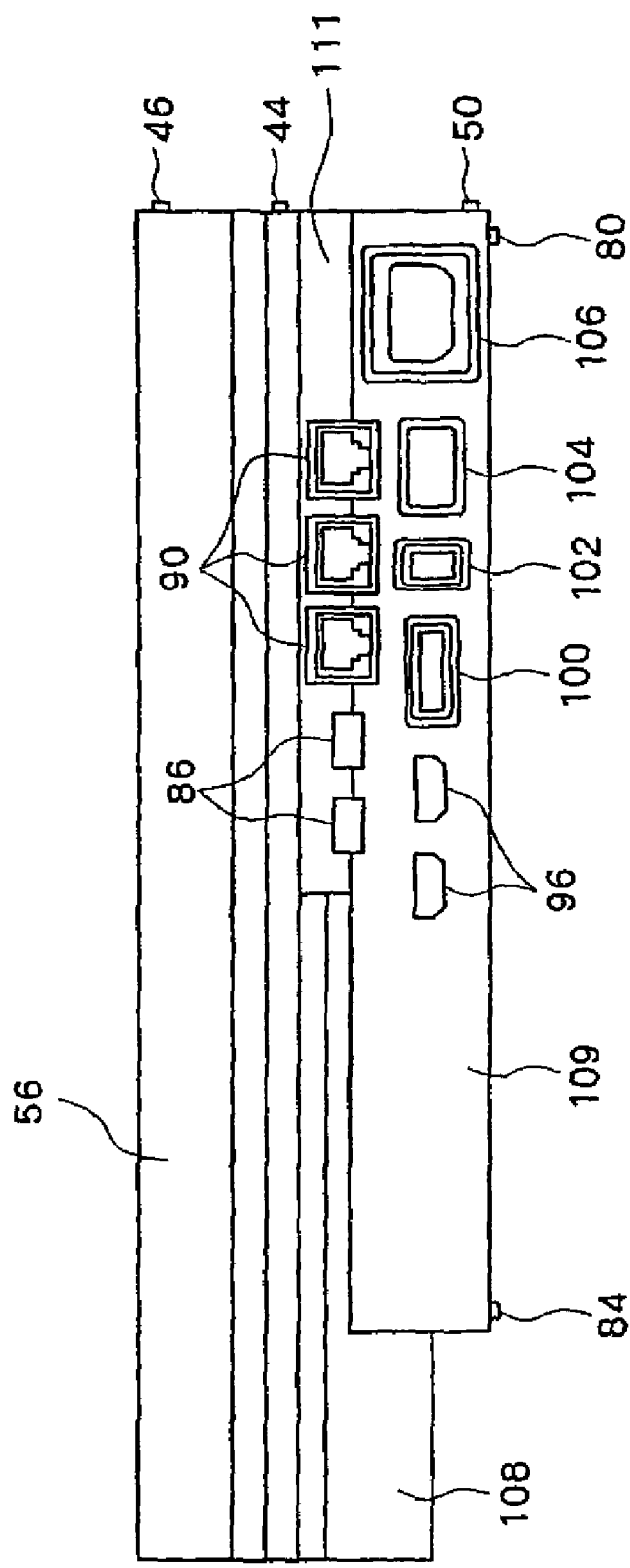
FIG. 5 is a back view of the electronic device according to the embodiment of the invention of FIG. 1.
Figure 6:
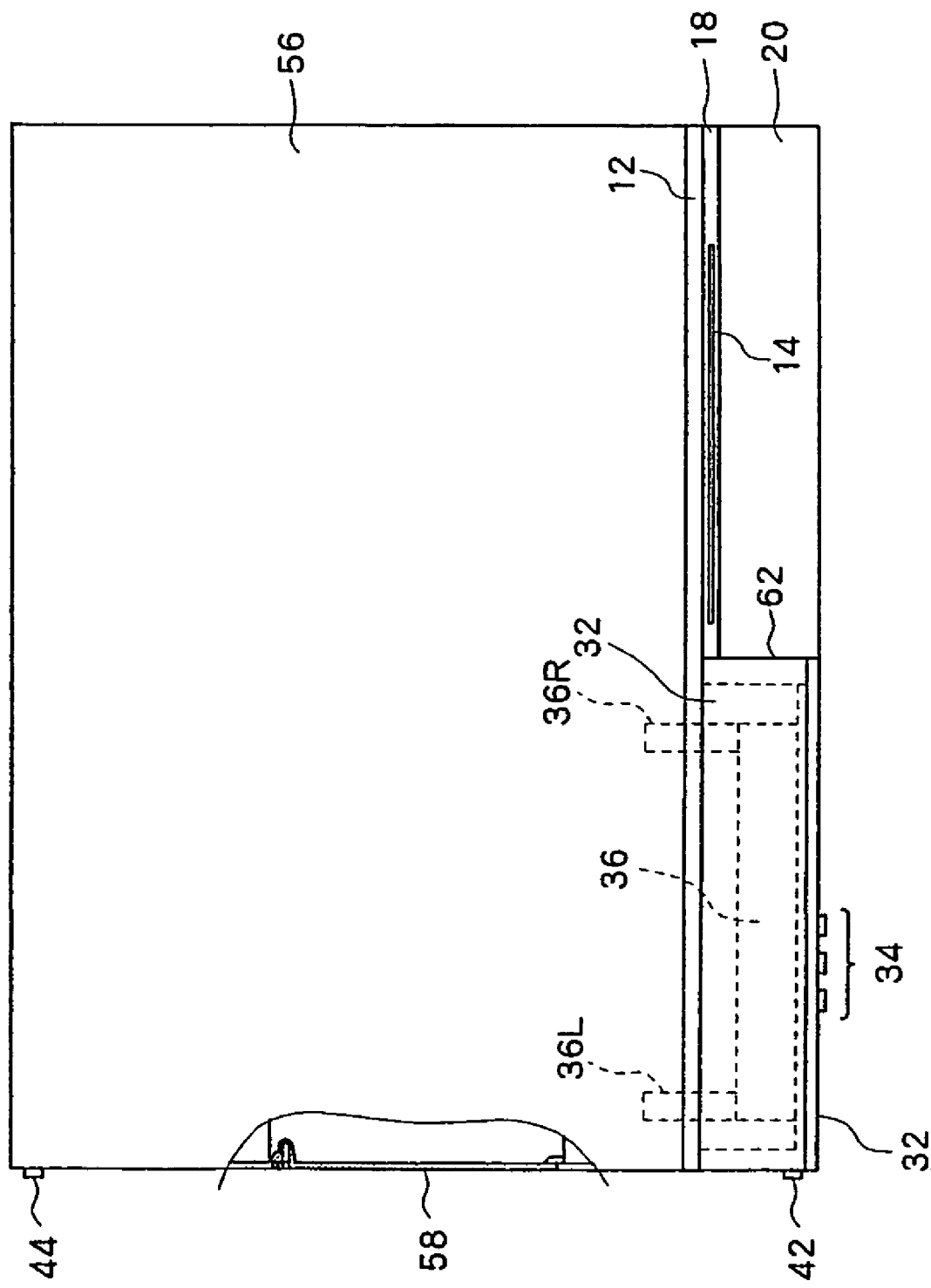
FIG. 6 is a top view of the electronic device according to the embodiment of the invention of FIG. 1.
Figure 7:
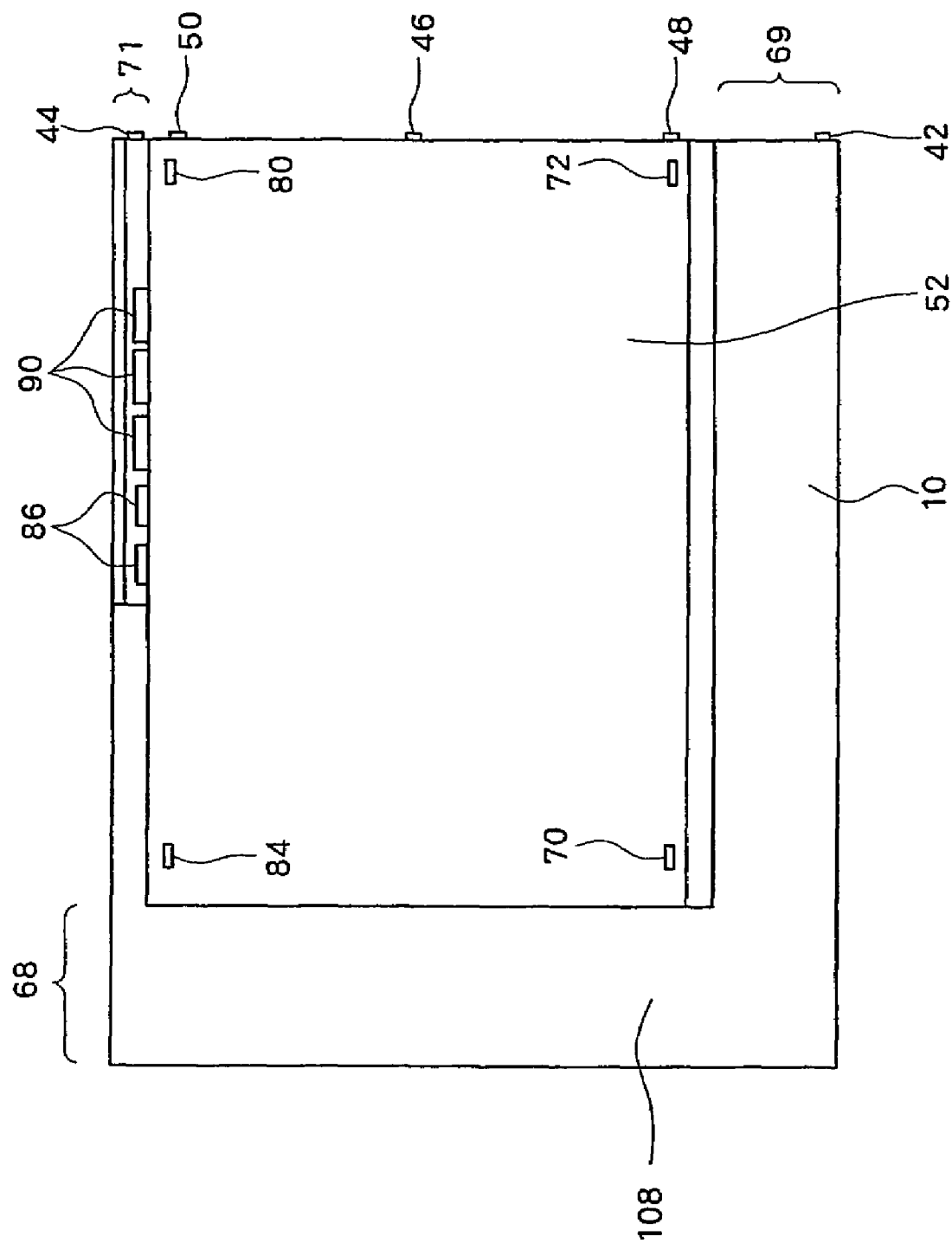
FIG. 7 is a bottom view of the electronic device according to the embodiment of the invention of FIG. 1.

FIG. 1 is a perspective view of an electronic device according to the embodiment, FIG. 2 is a front view, FIG. 3 is a left side view, FIG. 4 is a right side view, FIG. 5 is a back view, FIG. 6 is a top view, and FIG. 7 is a bottom view. The electronic device can be placed both horizontally and vertically. The electronic device is configured by an approximately elliptical cylinder-like main housing 10 that is disposed horizontally in a horizontal placement condition of the electronic device, and an approximately boxlike base portion 52 which is attached to a lower portion of the main housing 10. The base portion 52 supports the main housing 10 by sidewalls and the inside of the base portion 52 is communicated with the inside of the main housing 10. The main housing 10 is arranged in such a manner that a longitudinal direction of the housing is horizontal to a setting surface. An information processing device, an information storage device, various medium drive devices and the like of the electronic device are accommodated in one of the main housing 10 and the base portion 52, or accommodated in and over the two, respectively. In particular, a rectangular circuit board and the like are efficiently accommodated in the base portion 52.

In the front of the base portion 52, a front skirt 64 is formed. The lower portion of the front skirt 64 overhangs to the front, so that beauty of the electronic device and stability when the electronic device is placed are improved. Moreover, a plurality of USB terminals 74 are provided above the front skirt 64, and in a right side of each of the USB terminals 74, a lamp 74a (for example, LED) is provided, which is turned on when the USB terminal 74 is operated. Therefore a user is notified of the USB terminal 74 being in operation. Moreover, the electronic device can charge an external device (for example, a controller having a battery set therein) connected to the USB terminal 74 during operation or sleep (on standby for operation). In addition, the lamp 74a is turned on in a color for notifying the user of an on-charge state when the battery is charging, and when the battery is fully charged, a lighting color of the lamp 74a is changed in order to notify the user of a fact that the battery has been fully charged.

Lateral and longitudinal sizes of the base portion 52 are narrow compared with those of the main housing 10. The base portion 52 is attached in such a manner that a left side of the portion is approximately even with a left side of the main housing 10. Therefore, the base portion 52 is provided in such a manner that a front face, right side face, and back face 109 of the portion are situated inside with respect to edges of the main housing 10, respectively.

As shown in FIG. 3 and FIG. 4, a front-side overhanging portion 69 is provided in a front side of the main housing 10, so that when the user looks down the electronic device from above, they do not see the USB terminals 74. However, the front skirt 64 is formed on the base portion 52 as described before, and the user can insert a terminal of a peripheral device of the electronic device into the USB terminals 74 by viewing the front skirt 64. Furthermore, the front-side overhanging portion 69 is situated above a connection portion of the USB terminals 74 and thus protects the connection portion of the USB terminals 74. A back-side overhanging portion 71 is provided in a back side (back face side) of the main housing 10. As described later, various terminals for connection to the electronic device are also provided on a back face 109 of the base portion 52 and a back face 111 of the main housing 10. Connection portions for these terminals are protected by the back-side overhanging portion 71 of the main housing 10. Moreover, as shown in FIG. 2, an overhanging portion 68 is provided in a right side of the main housing 10.

The main housing 10 has a rectangular frame member 60 arranged horizontally to the setting surface. The frame member 60 has an appropriate thickness for securing stiffness of the electronic device. In a left edge portion of the frame member 60, an upper-left side plate 110 having a shape of an elliptic plate that has been cut along a longitudinal axis is attached in such a manner that the upper-left side plate 110 stands. Also, a lower-left side plate 112 similarly having a shape of an elliptical plate that has been cut along a longitudinal axis is attached in such a manner that the lower-left side plate 112 is suspended. Similarly in a right edge portion, an upper-right side plate 116 having a shape of an elliptical plate that has been cut along a longitudinal axis is attached in the standing manner, and a lower-right side plate 118 similarly having a shape of an elliptic plate that has been cut along a longitudinal axis is attached in the suspending manner.

A curved plate-like aluminum cover 56 is attached along curved upper edge portions of the upper-left side plate 110 and the upper right side plate 116, which covers a top of the electronic device 10. Moreover, a curved aluminum cover 108 is attached along curved lower edge portions of the lower-left side plate 112 and the lower-right side plate 118, and the aluminum cover 108 and the base portion 52 cover a bottom of the main housing 10.

Thus, the aluminum covers 56 and 108 comprise elliptical side panels of the main housing 10 in the approximately elliptical cylinder form, the upper-left side plate 110 and the lower-left side plate 112 comprise one end-face portion of the main housing 10, and the upper-right side plate 116 and the lower-right side plate 118 comprise another end-face portion. The aluminum covers 56 and 108 are curved, respectively, thereby improving beauty of the main housing 10 and securing spaces outward in a radial direction of the main housing 10, that is, spaces above and below the main housing 10. This improves cooling efficiency of the electronic device. The aluminum covers 56 and 108, upper-left side plate 110, lower-left side plate 112, upper-right side plate 116 and lower-right side plate 118 are formed, for example, by extrusion of aluminum.

The main housing 10 has a shape having a notch in the front of the housing in the elliptical cylinder form in a horizontal placement condition of the electronic device. The notch portion is comprised of a front face of a panel member 12 arranged in a front edge portion of the aluminum cover 56 comprising a top of the main housing 10, and front board portions 20 and 22 which spreads from a lower edge portion of the front face of the panel member 12 to the front, and is provided horizontally to the setting surface of the electronic device. The panel member 12 has insertion port formation surface portions 18, 24 in an inclined front face thereof. The front board portions 20 and 22 will be described in detail later.

An insertion port formation surface portion 18 is provided in a right side of the electronic device. An insertion port, which is for inserting a main storage medium that stores an operation program of the electronic device, is formed in the insertion port formation surface portion 18. Specifically, the operation program is stored in an optical disk, and an optical disk insertion port 14 for inserting the optical disk is formed in the insertion port formation surface portion 18. In the back of the optical disk insertion port 14, an automatic loading mechanism is provided. Thus, when the user inserts part of the optical disk into the optical disk insertion port 14, the optical disk is automatically moved through a disk path 82

(refer to FIG. 4) parallel to the setting surface in the horizontal placement condition of the electronic device, and then the optical disk as a whole is loaded into the electronic device (refer to FIG. 4).

Figure 8:
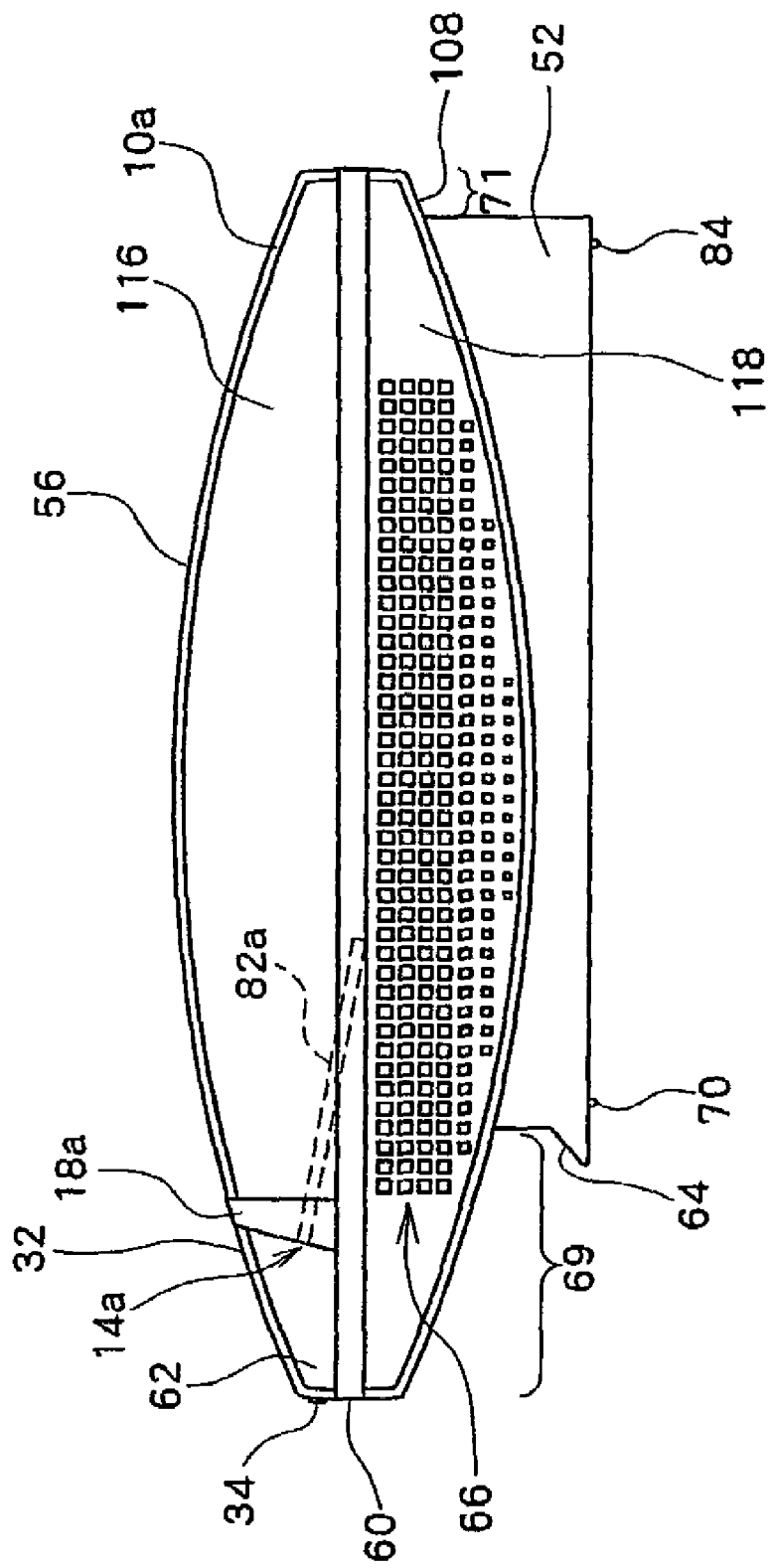
FIG. 8 is a right side view of an electronic device according to another embodiment of the invention.

As shown in FIG. 8, a disk path 82a not parallel to the setting surface may be provided. At that time, the disk path 82a is provided approximately perpendicular to the insertion port formation surface portion 18, as a result of which a user's eye direction is approximately parallel to the disk path 82a when the electronic device is horizontally placed, and consequently an electronic device having better functionality is realized. On the other hand, the insertion port formation surface portion 24 is provided in a left side of the electronic device, and an insertion port, which is for inserting a medium that stores data used in the operation program of the electronic device is formed. Specifically, in the insertion port formation surface portion 24, a memory stick (trademark) insertion port 26, an SD (trademark) card insertion port 28, and a compact flash (trademark) card insertion port 30 are formed in this order from the left in a direction approximately parallel to a longitudinal direction of the main housing 10.

A lower end of the insertion port formation surface portion 18 is connected to a top of the frame member 60. The flat front board portion 20 formed inside the frame member 60 spreads from a lower edge of the insertion port formation surface portion 18 to the front, and parallel to the setting surface in the horizontal placement condition of the electronic device. Similarly, the lower end of the insertion port formation surface portion 24 is connected to the top of the frame member 60. The flat front board portion 22 formed inside the frame member 60 spreads from the lower edge of the insertion port formation surface portion 24 to the front, and parallel to the setting surface in the horizontal placement condition of the electronic device. In the electronic device, upper surface of the front board portions 20, 22 spread in a lower side of the insertion port of each information storage medium in the horizontal placement condition of the electronic device. Therefore, when a user inserts the medium into the insertion port, or removes it from the insertion port, even if a medium slips from the hand, the medium is put on the front board portions 20 and 22 and thus prevented from falling off to the floor. Moreover, the front board portion 22 is formed wide compared with the area of the memory stick or the SD card. Therefore, when the medium is exchanged, the user can temporarily place it on the front board portion 22, resulting in improvement in convenience. Furthermore, since the insertion direction of each medium is approximately parallel to the front board portions 20 and 22, the user can use the front board portions 20 and 22 as guides when each medium is inserted.

The front board portion 22 and the insertion port formation surface portion 24 are covered with an opening-and-closing cover 76. The opening-and-closing cover 76 includes a curved plate-like aluminum cover 32 formed by extrusion of aluminum. The aluminum cover 32 is attached to a cover support member 36 formed, for example, from plastic. The cover support member 36 includes a flat plate portion to be adhered to a back face of the aluminum cover 32. Hinge arms 36L, 36R are attached to both ends of one side of the cover support member 36. The hinge arms 36L, 36R are inserted into the inside of the electronic device from openings formed in left and right sides of insertion port formation surface portion 24. Ends of the hinge arms 36L, 36R are rotatably pivoted by an opening-and-closing shaft 78 (refer to FIG. 3). Moreover, stoppers 40, 38 are vertically arranged in left and right sides of the front board portion 22, and when the opening-and-closing cover 76 is closed, they are contacted to both ends of the aluminum cover 32. The stopper 40 spreads to the front in the lower side of the insertion port formation surface portion 24 in the vertical placement condition of the electronic device. Thus, the user can temporarily place various media on the stopper 40, leading to improvement in convenience.

The upper-left side plate 110 is vertically arranged in a further lateral side of the stopper 40. Moreover, a partition board 62 is vertically arranged in a further lateral side of the stopper 38. The partition board 62 is formed by extrusion of aluminum. The partition board 62 separates between the insertion port formation surface portions 18 and 24, and separates between the front board portions 20 and 22. When the opening-and-closing cover 76 is disposed in a closing position, a left side of the opening-and-closing cover 76 is closed by the left side plate 110, and a right side is closed by the partition board 62. On a top surface of the aluminum cover 32, an anti-slip protrusion 34 is formed in an edge portion in a front side. The user can easily open or close the opening-and-closing cover 76 by putting a hand on the anti-slip protrusion 34.

According to the electronic device, the opening-and-closing cover 76 is attached in such a manner that it can move between a closing position (position shown by a broken line in FIG. 3) where the front board portion 22 and the insertion port formation surface portion 24 are covered and an opening position (position shown by a two-dot chain line in FIG. 3) where they are exposed. Therefore, when the user does not insert or remove the memory stick, SD card, or compact flash, the opening-and-closing cover 76 is set to the closing position, thus preventing accumulation of dust in the front board portion 22 or the stopper 40, or entering of dust into the memory stick insertion port 26, SD card insertion port 28, and compact flash card insertion port 30. Moreover, in the event that the electronic device is mainly used for reproduction and execution of various digital contents recorded in the optical disk, only the optical disk insertion port 14 necessary for using the optical disk is exposed, and insertion ports for other media are normally closed by the opening-and-closing cover 76. Thus, even a beginner can easily understand how to use the unit.

Next, the left and right side faces of the main housing 10 are described. The upper-left side plate 110 arranged on the left side face of the main housing 10 has an extended interface cover 58 attached. The user removes the extended interface cover 58, so that they can connect an information storage medium such as a hard disk or a ROM cartridge, or a peripheral instrument such as a communication module or a sensor, to the electronic device (refer to FIG. 3). A mounting position of the peripheral instrument, which is covered with the extended interface cover 58, is provided near a central position of the left side face of the main housing 10. Thus, the electronic device is mounted with the peripheral instrument. Also when the electronic device is placed vertically, the center of the gravity of the electronic device is concentrated to a further lower side, and consequently the electronic device is set stably.

Moreover, a protrusion (for example, made of rubber) for vertical placement is provided on the left side face of the main housing 10, so that when the electronic device is placed vertically, the electronic device is set stably, and a cooling effect of the electronic device is increased by setting the electronic device so as not to contact the setting surface. In particular, a protrusion 46 is provided on an upper edge portion of the upper-left side plate 110. Moreover, two protrusions 42, 44 are also provided on a portion of the frame member 60 that is beyond the left side end face of the main housing 10. Furthermore, two protrusions 48, 50 are also provided on a left side end face of the base portion 52 attached on the lower portion of the main housing 10. The electronic device is supported by the protrusions 42, 44, 46, 48 and 50 in the vertical placement. In particular, since the frame member 60 is attached with the protrusions 42, 44, the electronic device is stably placed in a vertical direction.

Moreover, as shown in FIG. 7, protrusions 70, 72, 80 and 84 are attached to a bottom of the base portion 52. In horizontal placement of the electronic device, the electronic device is supported by the protrusions 70, 72, 80 and 84.

On the right side face of the main housing 10 of the main electronic device, the upper-right side plate 116 and the lower-right side plate 118 are provided as described before. Among them, many vent holes 66 are opened in the lower right side plate 118 (refer to FIG. 2 and FIG. 4). Not-shown fans are provided within the vent holes 66 for cooling the electronic device. The vent holes 66 are situated in the lower side in the horizontal placement condition, and at a place near the setting surface such as a floor, the number of the vent holes 66 is small, in addition, the size (opening area) of the holes is reduced. Specifically, the vent holes 66 are formed on a plurality of arrays provided approximately parallel to the setting surface. The vent holes 66 are formed in such a manner that the number or size of the vent holes 66 disposed on the arrays is varied depending on a distance from the setting surface. According to such a composition, when air is exhausted through the vent holes 66, dust accumulated on the setting surface is hardly disturbed by the air. When air is introduced through the vent holes 66 conversely, it is still hard for the dust accumulated on the setting surface to be drawn in.

In the electronic device, an overhanging portion 68 is provided in the right side of the main housing 10, in which the vent holes 66 are formed, in addition to the overhanging portions 69, 71 in the front side and a rear side of the main housing 10 (refer to FIG. 2). In particular, the right side face in which the vent holes 66 are formed and a right side face of the base portion 52 are not formed in the same plane, and the right side face of the base portion 52 is formed inside with respect to the right side face of the main housing 10. A lower side of the right side portion of the main housing 10 is not attached with the base portion 52, and the right side portion is in a floating condition in the air. Thus, a space is secured in a downward direction of the vent holes 66 in addition to upward, left and right directions of them, and consequently the electronic device is efficiently cooled.

Finally, a back face of the electronic device is described. In the back face, various connection terminals and switches are disposed in two lines. Terminals disposed in a lower line in the various connection terminals and the like are two HDMI (High Definition Multimedia Interface) terminals 96, an AV terminal 100, a light digital terminal 102, a main power switch 104, and a power cable terminal 106. These are provided in this order from the left on a back face 109 of the base portion 52. Terminals disposed in an upper line in the various connection terminals and the like are two USB terminals 86 and three Ethernet ports 90. These are provided in this order from the left over the back face 109 of the base portion 52 and the planar back face 111 of the main housing 10. As shown in FIG. 3, the planar back face 111 is situated in a fore side of a rearmost end face of the main housing 10. Moreover, as described before, the backside overhanging portion 71 is provided at the backside of the main housing 10. Thus, the connection portions of various connection terminals of peripheral equipment connected to the back side of the electronic device are protected by the main housing 10.

According to the electronic device as described hereinbefore, the main housing 10 is formed in the approximately elliptical cylinder form, and disposed in such a manner that the longitudinal direction of the housing (axial direction of the elliptic cylinder) is approximately horizontal to the setting surface. Therefore, even if the instrument is accommodated in an accommodation rack such as an audio board, since a space is secured in the upper portion of the main housing 10, cooling efficiency of the electronic device is increased. Moreover, the front board portions 20, 22 are formed in the front of the optical disk insertion port 14, memory-stick insertion port 26, SD card insertion port 28, and compact-flash insertion port 30. Thus, while handling various media, the media are prevented from directly falling to the floor, leading to improvement in convenience of the electronic device.

The invention is not limited to the above embodiments, and it will be apparent to those skilled in the art that various modifications can be made, and the modifications are also included in the scope of the invention.

The invention claimed is:

1. An electronic device, comprising:
a main housing formed in an approximately elliptical cylinder form, disposed such that a longitudinal direction is approximately horizontal to a setting surface, and including a medium insertion port for inserting a portable information storage medium;
an approximately boxlike base portion attached to a lower portion of the main housing and including front and back ends opposing one another in a direction transverse to the longitudinal direction, and
at least one terminal provided on the front end of the base portion,
wherein the base portion is smaller than the main housing in the direction transverse to the longitudinal direction, such that a first portion of the main housing overhangs both the front end of the base portion and the at least one terminal.

2. The electronic device according to claim 1, wherein the base portion is attached to the lower portion of the main housing while being offset in at least one direction of the longitudinal direction and a lateral direction to the main housing in a plane view.

3. The electronic device according to claim 1, wherein
the base portion includes third and fourth ends opposing one another in the longitudinal direction;
the main housing includes first and second ends opposing one another in the longitudinal direction; and
the base portion is shorter than the main housing in the longitudinal direction such that at least one of the first and second ends of the main housing overhangs at least one of the third and fourth ends of the base portion.

4. The electronic device according to claim 3, wherein the electronic device is formed such that the longitudinal direction may be placed horizontally or vertically, such that when placed vertically, the at least one of the first and second ends of the main housing overhanging the base portion is above the base portion.

5. An electronic device, comprising:
a main housing formed in an approximately elliptical cylinder form, and disposed such that a longitudinal direction is approximately horizontal to a setting surface; and
an approximately boxlike base portion attached to a lower portion of the main housing and including front and back ends opposing one another in a direction transverse to the longitudinal direction; wherein:
the base portion is smaller than the main housing in the direction transverse to the longitudinal direction, such that an overhang portion of the main housing overhangs the front end of the base portion, the overhang portion includes an upper surface and a lower surface, the upper surface having at least one insertion port formation surface portion facing in the direction of the front end and including a medium insertion port for inserting a portable information storage medium in the main housing, and the overhang portion includes a front board portion disposed below the medium insertion port, and extending approximately horizontally from a lower edge of the at least one insertion port formation surface portion, parallel to the setting surface and terminating at a front edge of the overhang portion such that the front board portion is separate from the lower surface of the overhang portion, thereby creating a notch in the main housing.

6. The electronic device according to claim 5, further comprising a cover covering one or more parts of the front board portion.

7. The electronic device according to claim 6, wherein the cover is supported in such a manner that it can move between a position at which the one or more parts of the front board portion are covered, and a portion at which the one or more parts of the portion are exposed.

8. The electronic device according to claim 6, wherein the cover covers the medium insertion port in addition to the one or more parts of the front board portion.

9. The electronic device according to claim 6, wherein at least one of:

the electronic device is formed in a manner that it can be placed both vertically and horizontally, and has a plurality of the insertion port formation surface portions, the cover covers a front board portion disposed in a lower side of the medium insertion port formed in one of the plurality of insertion port formation surface portions, the plurality of insertion port formation surface portions are disposed in a manner that they are arranged in a horizontal direction when the electronic device is horizontally placed, and arranged in a vertical direction when it is vertically placed, and the one of the plurality of insertion port formation surface portions is disposed to be situated at the lowest side when the electronic device is vertically placed.

* * * * *